US009316856B2

(12) United States Patent
Park et al.

(10) Patent No.: US 9,316,856 B2
(45) Date of Patent: Apr. 19, 2016

(54) METHOD OF DRIVING TOUCH SENSING DISPLAY PANEL AND DISPLAY APPARATUS FOR PERFORMING THE SAME

(75) Inventors: Dong-Won Park, Hwaseong-si (KR); Bong-Hyun You, Yongin-si (KR); Jae-Sung Bae, Suwon-si (KR); Sang-Je Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 388 days.

(21) Appl. No.: 13/348,516

(22) Filed: Jan. 11, 2012

(65) Prior Publication Data

US 2013/0009888 A1 Jan. 10, 2013

(30) Foreign Application Priority Data

Jul. 7, 2011 (KR) ........................ 10-2011-0067125

(51) Int. Cl.
G06F 3/041 (2006.01)
G02F 1/1333 (2006.01)
G06F 3/042 (2006.01)
G09G 3/36 (2006.01)
G02F 1/133 (2006.01)

(52) U.S. Cl.
CPC ............ *G02F 1/13338* (2013.01); *G06F 3/041* (2013.01); *G06F 3/0416* (2013.01); *G06F 3/0421* (2013.01); *G02F 2001/13312* (2013.01); *G09G 3/3674* (2013.01); *G09G 2310/02* (2013.01); *G09G 2310/0224* (2013.01); *G09G 2310/061* (2013.01)

(58) Field of Classification Search
CPC combination set(s) only.
See application file for complete search history.

(56) References Cited

U.S. PATENT DOCUMENTS

| 6,222,589 | B1 * | 4/2001 | Faroudja et al. ............... 348/448 |
| 6,348,916 | B1 * | 2/2002 | Jeong et al. .................... 345/213 |
| 6,717,557 | B2 * | 4/2004 | Ishizuka .......................... 345/60 |
| 2004/0217935 | A1 * | 11/2004 | Jeon et al. ...................... 345/100 |
| 2005/0134751 | A1 * | 6/2005 | Abileah et al. ................... 349/42 |
| 2005/0219188 | A1 * | 10/2005 | Kawabe et al. ................... 345/94 |
| 2007/0205999 | A1 * | 9/2007 | Akimoto et al. ............... 345/207 |
| 2008/0122804 | A1 * | 5/2008 | Kinoshita et al. ............. 345/175 |
| 2009/0085899 | A1 * | 4/2009 | Ando et al. ..................... 345/205 |
| 2009/0122007 | A1 * | 5/2009 | Tsuzaki et al. ................. 345/156 |
| 2009/0195511 | A1 * | 8/2009 | Cites et al. ..................... 345/173 |
| 2010/0013813 | A1 * | 1/2010 | Katoh et al. ................... 345/207 |
| 2010/0212974 | A1 * | 8/2010 | Kim .......................... 178/18.03 |
| 2010/0262384 | A1 * | 10/2010 | Marfani et al. .................. 702/43 |
| 2010/0295824 | A1 * | 11/2010 | Noguchi et al. ............... 345/175 |
| 2012/0062817 | A1 * | 3/2012 | Kanbayashi et al. ........... 349/61 |

FOREIGN PATENT DOCUMENTS

| JP | 1994217242 | 8/1994 |
| JP | 2007279543 | 10/2007 |
| JP | 2010187332 | 8/2010 |
| KR | 0920374 | 9/2009 |

* cited by examiner

*Primary Examiner* — Linh N Hoffner
(74) *Attorney, Agent, or Firm* — Innovation Counsel LLP

(57) ABSTRACT

In a method of driving touch sensing display panel and a display apparatus for performing the method, image data are outputted to the touch sensing display panel during an active period of a frame, the touch sensing display panel comprising a display substrate including a switching element connected to a data line extending in a column direction and a gate line extending in a row direction, and a touch sensing substrate including a light sensing part connected to a read-out line substantially parallel to the data line and a scan line substantially parallel to the gate line. A sensing signal is read out through the read-out line during a blanking period of the frame.

15 Claims, 8 Drawing Sheets

METHOD OF DRIVING TOUCH SENSING DISPLAY PANEL AND DISPLAY APPARATUS FOR PERFORMING THE SAME

PRIORITY STATEMENT

This application claims priority under 35 U.S.C. §119 to Korean Patent Application No. 2011-0067125, filed on Jul. 7, 2011 in the Korean Intellectual Property Office (KIPO), the contents of which are herein incorporated by reference in their entireties.

BACKGROUND OF THE INVENTION

1. Field of the Invention

Exemplary embodiments of the present disclosure relate to a method of driving a touch sensing display panel, and a display apparatus for performing the method of driving the touch sensing display panel. More particularly, exemplary embodiments concern a method of driving a touch sensing display panel to detect a sensing signal accurately, and a display apparatus for performing the method.

2. Description of the Related Art

In the field of liquid crystal display (LCD) panels, a touch sensing display panel has been developed which has an input function to sense a touch position by including a sensing element, in addition to displaying an image. For example, the touch sensing display panel may include a first substrate upon which pixel electrodes display the image and switching elements are connected to the pixel electrodes; and a second substrate upon which a sensing element detects light and a driving element controls the sensing element; with a liquid crystal layer disposed between the display substrate and the touch sensing substrate.

If an outer touch is applied on the touch sensing display panel, a light becomes incident on the sensing element, and a photocurrent is generated in the sensing element by the incident light. A detecting circuit electrically connected to the touch sensing display panel detects a touch position using a difference between the photocurrent and a dark current of the light sensing element. Here, the dark current is measured before the incident light is absorbed.

Generally, a method of driving the touch sensing display panel includes displaying an image on the touch sensing display panel while reading out a sensing signal corresponding to a touch position of an outer object that contacts or comes close to the touch sensing display panel during an active period of a frame. Because the sensing signal is read out simultaneously while the image is being displayed, electrical coupling noise occurs when a data voltage transferred in a data line interferes with the sensing signal transferred in a read-out line. Thus the reliability of the sensing signal is compromised by the electrical coupling noise.

SUMMARY

Exemplary embodiments provide a method of driving the touch sensing display panel capable of increasing reliability of a sensing signal.

Exemplary embodiments also provide a display apparatus for performing the method of driving the touch sensing display panel.

According to an exemplary embodiment, a method is provided of driving a touch sensing display panel. In the method, image data are outputted to the touch sensing display panel during an active period of a frame, the touch sensing display panel comprising a display substrate including a switching element connected to a data line extending in a column direction and a gate line extending in a row direction; and a touch sensing substrate including a light sensing part connected to a read-out line substantially parallel to the data line and a scan line substantially parallel to the gate line. A sensing signal is read out through the read-out line during a blanking period of the frame.

In an exemplary embodiment, reading out the sensing signal may include outputting a scan signal to the scan line by a two-frame period using an interlace scan mode.

In an exemplary embodiment, outputting the scan signal may include outputting an odd-numbered scan signal during the blanking period of an N-th frame (N is a natural number) and outputting an even-numbered scan signal during the blanking period of an (N+1)-th frame.

In an exemplary embodiment, the light sensing part may include a first light sensing element sensing a first light and a second light sensing element sensing a second light and the touch sensing substrate may include a light sensor row in which a plurality of light sensing parts is arranged along the row direction, and at least one light sensor row may receive a substantially same scan signal.

In an exemplary embodiment, the odd-numbered scan signal may be provided to the light sensing parts included in the first light sensor row and to a second light sensor row adjacent to the first light sensor row; and the even-numbered scan signal may be provided to the light sensing parts included in a third light sensor row adjacent to the second light sensor row and to a fourth light sensor row adjacent to the third light sensor row.

According to another exemplary embodiment, there is provided a method of driving a touch sensing display panel. In the method, an image data are provided to a data line of a touch sensing display panel during an active period of a frame. Sensing signals are read out sensed by a light sensing part of the touch sensing display panel during the active period of the frame. Coupling noise included in the sensing signal is removed based on a coupling value preset corresponding to the image data.

In an exemplary embodiment, the coupling value may be stored as a look-up table (LUT) according to grayscales of the image data.

In an exemplary embodiment, reading out the sensing signal may include providing the scan signal to the scan line by one frame period using a progressive scan mode.

According to still another exemplary embodiment, a display apparatus is provided including a touch sensing display panel, a data driving part and a read-out driving part. The touch sensing display panel includes a display substrate that includes a switching element connected to a data line extending in a column direction and a gate line extending in a row direction; and a touch sensing substrate that includes a light sensing part connected to a read-out line substantially parallel to the data line and a scan line substantially parallel to the gate line. The data driving part outputs image data to the touch sensing display panel during an active period of a frame. The read-out driving part reads out a sensing signal through the read-out line during a blanking period of the frame.

In an exemplary embodiment, a timing control part may generate a timing control signal based on a master clock signal. A sensing control part may generate a sensing control signal based on the timing control signal. A scan driving part may provide a scan signal to the scan line by a two-frame period using an interlace scan mode.

In an exemplary embodiment, the scan driving part may output an odd-numbered scan signal during the blanking period of an N-th frame (N is a natural number) and output an even-numbered scan signal during the blanking period of an (N+1)-th frame.

In an exemplary embodiment, the touch sensing display panel may include a light sensor row in which a plurality of light sensing parts is arranged along the row direction, and the scan driving part may provide a substantially same scan signal to at least one light sensor row.

In an exemplary embodiment, the light sensing part may include a first driving element connected to a first read-out line and a first scan line; a first light sensing element connected to a first bias line adjacent to the first read-out line and the first driving element, and sensing a first light; a second driving element connected to a second read-out line and a second scan line; and a second light sensing element connected to a second bias line adjacent to a first bias line and the second driving element, and sensing a second light.

According to still another exemplary embodiment, there is provided a display apparatus includes a touch sensing display panel, a data driving part, a read-out driving part and a sensing control part. The touch sensing display panel comprises a display substrate that includes a switching element connected to a data line extending in a column direction and a gate line extending in a row direction, and a touch sensing substrate that includes a light sensing part connected to a read-out line substantially parallel to the data line and a scan line substantially parallel to the gate line. The data driving part outputs image data to the touch sensing display panel during an active period of a frame. The read-out driving part reads out a sensing signal through the read-out line during a blanking period of the frame. The sensing control part removes coupling noise included in the sensing signal based on a coupling value preset corresponding to the image data.

In an exemplary embodiment, a timing control part may generate a timing control signal based on a master clock signal and including a memory storing the image data. A look-up table (LUT) may store the coupling value according to grayscales of the image data.

In an exemplary embodiment, the scan driving part may provide a scan signal to the scan line by one frame period according to a progressive scan mode.

According to the foregoing disclosure, in the touch sensing display panel having the display substrate and the touch sensing substrate integrally formed with each other, coupling noise between the image signal and the sensing signal may be removed so that the reliability of the sensing signal may be improved.

BRIEF DESCRIPTION OF THE DRAWINGS

The above and other features and advantages will become more apparent by describing in detailed exemplary embodiments thereof with reference to the accompanying drawings, in which.

DETAILED DESCRIPTION OF THE INVENTION

Hereinafter, aspects of the foregoing disclosure will be explained in detail with reference to the accompanying drawings.

Figure 1:
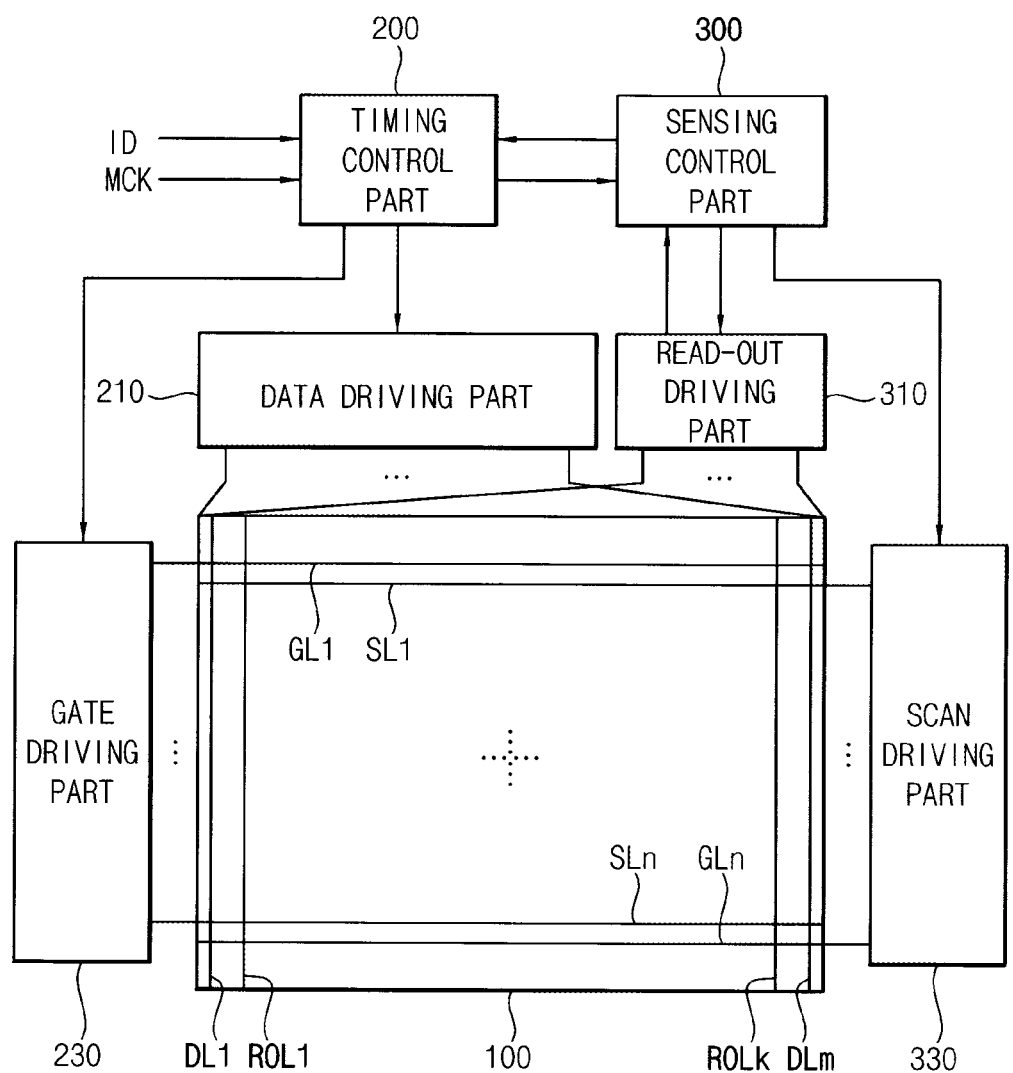
FIG. 1 is a block diagram illustrating a display apparatus according to an exemplary embodiment.
Figure 2:
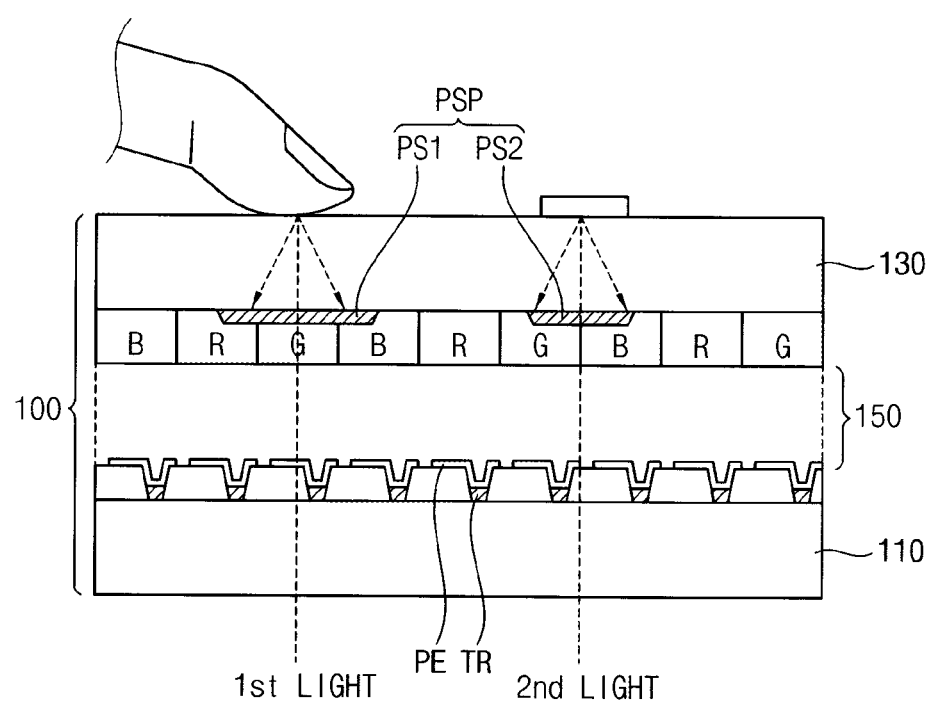
FIG. 2 is a cross-sectional view illustrating a touch sensing display panel of FIG. 1.

FIG. 1 is a block diagram illustrating a display apparatus according to an exemplary embodiment. FIG. 2 is a cross-sectional view illustrating a touch sensing display panel of FIG. 1.

Referring to FIGS. 1 and 2, the display apparatus includes a touch sensing display panel 100; a timing control part 200; a data driving part 210; a gate driving part 230; a sensing control part 300; a read-out driving part 310 and a scan gate driving part 330.

The touch sensing display panel 100 displays an image, and generates a sensing signal corresponding to a position of an outer object touched on a surface of the touch sensing display panel 100. The touch sensing display panel 100 includes a display substrate 110, a touch sensing substrate 130 and a liquid crystal layer 150. The display substrate 110 includes m data lines DL1, DL2, . . . DLm extending along a column direction D1; n gate lines GL1, GL2, . . . GLn extending along a row direction D2; a plurality of switching elements TR, and a plurality of sub-pixel electrodes PE (where m and n are natural numbers). Each of the switching elements TR is connected to a data line DL, a gate line GL and a sub-pixel electrode PE.

The touch sensing substrate 130 includes k (k is a natural number) read-out lines ROL1, ROL2, . . . ROLk; n scan lines SL1, . . . SLn; a plurality of light sensing parts PSP; and a plurality of color filters, which may include red, green and blue filters R, G and B. Each of the red, green and blue filters R, G and B may face the sub-pixel electrode PE of the display substrate 110. For example, the red, green and blue filters R, G and B may be arranged in the row direction D2 corresponding to the sub-pixel electrodes arranged in the row direction D2. The read-out lines ROL1, ROL2, . . . ROLk are substantially parallel to the data lines DL1, DL2, . . . DLm; and the scan lines SL1, SL2, . . . SLn are substantially parallel to the gate lines GL1, GL2, . . . GLn. Each of the light sensing parts PSP is connected to a read-out line and a scan line. The light sensing part PSP may include a first light sensing element TRI sensing a first light and a second light sensing element TRV sensing a second light.

Each of the light sensing parts PSP may be disposed in an area in which at least one pixel unit is disposed. For example, the pixel unit may be defined by an area in which sub-pixel electrodes PE corresponding to the region in which the red, green and blue filters R, G and B are disposed. Hereinafter, the first sensing light may be referred to as an infrared (IR) light and the second sensing light may be referred to as a visible light. A light source part of the display apparatus may be a first light emitting diode (IR LED) emitting infrared light and a second LED emitting visible light.

The first light sensing element TRI senses the infrared light reflected from the outer object such as a finger which is touched on the surface of the touch sensing display panel 100 to generate the sensing signal. The second light sensing element TRV senses the visible light reflected from the outer object such as the finger which is touched on the surface of the touch sensing display panel 100 to generate the sensing signal.

The timing control part 200 receives a master clock signal MCK and the image data ID from an external device. The image data ID include a plurality of color data which include red data, green data and blue data. Color data have a plurality of grayscales. For example, color data of 8 bits may have 256 grayscales. The timing control part 200 generates a timing control signal based on the master clock signal MCK. The timing control signal may include a vertical synchronization signal, a horizontal synchronization signal, a data enable signal, etc.

The vertical synchronization signal defines a frame period, the horizontal synchronization signal defines a horizontal line period, and the data enable signal defines an active period in which the image data are outputted to the touch sensing display panel 100 and a blanking period in which the image data are not outputted to the touch sensing display panel 100. The frame period may be divided into the active period and the blanking period based on the data enable signal.

The timing control part 200 controls each operation of the data driving part 210, the gate driving part 230 and the sensing control part 300 based on the timing control signal.

The timing control part 200 may correct the image data ID using various correction algorithms. For example, the timing control part 200 may uniform a white level of the image data using an adaptive color correction (ACC) algorithm, and the image data of a present frame may be corrected based on the image data of a previous frame to improve a response time of the present image data using a dynamic capacitance compensation (DCC) algorithm.

The data driving part 210 converts the image data into data voltages such as an analogue type to output the data voltages to the data lines DL1, DL2, . . . DLm based on the timing control signal received from the timing control part 200. The data driving part 210 provides the data voltages to the data lines DL1, DL2, . . . DLm during the active period of an N-th frame (N is a natural number) in synchronization with the horizontal synchronization signal. The horizontal synchronization signal includes n pulses in the active period.

The gate driving part 230 outputs a plurality of gate signals to the gate lines GL1, GL2, . . . GLn based on the timing control signal received from the timing control part 200. The gate driving part 230 sequentially outputs the gate signals to the gate lines GL1, GL2, . . . GLn in synchronization with the horizontal synchronization signal during the active period of the N-th frame. For example, the gate driving part 230 outputs n gate signals in synchronization with n pulses of the horizontal synchronization signal.

The sensing control part 300 generates a sensing control signal for controlling an operation of the read-out driving part 310 and the scan driving part 330 based on the timing control signal received from the timing control part 220. For example, the sensing control part 300 generates the sensing control signal including a sensing enable signal and a sensing horizontal synchronization signal. The sensing enable signal is divided into a sensing active period in synchronization with the blanking period, and a sensing blanking period in synchronization with the active period. The sensing horizontal synchronization signal may include j pulses in the sensing active period (j is a natural number and may be less than or equal to n).

The sensing control part 300 may detect a touch position of the outer object touched on the surface of the touch sensing display panel 100 using the sensing signal received from the read-out driving part 310 frame by frame, based on the timing control signal received from the timing control part 200.

The read-out driving part 310 provides a sensing driving signal to the light sensing part PSP based on the sensing control signal received from the sensing control part 300, and reads out the sensing signal sensed from the light sensing part PSP through the read-out lines ROL1, ROL2, . . . ROLk. The sensing driving signal may include a first reference voltage and a first bias voltage for driving the first light sensing element TRI, and a second reference voltage and a second bias voltage for driving the second light sensing element TRV.

The scan driving part 330 outputs a plurality of scan signals during two frames using an interlace scan mode, based on the sensing control signal received from the sensing control part 300. The scan driving part 330 outputs an odd-numbered scan signal of j scan signals synchronized with j pulses of the sensing horizontal synchronization signal during the sensing active period of the N-th frame, and outputs an even-numbered scan signal of j scan signals synchronized with j pulses of the sensing horizontal synchronization signal during the sensing active period of an (N+1)-th frame.

According to the present exemplary embodiment, the touch sensing display panel 100 may display an image during the active period and may read out the sensing signal during the sensing active period corresponding to the blanking period. Therefore, the data line and the read-out line of the touch sensing display panel 100 are driven by a time-division mode so that coupling noise of the sensing signal with respect to the image data may be prevented.

Figure 3:
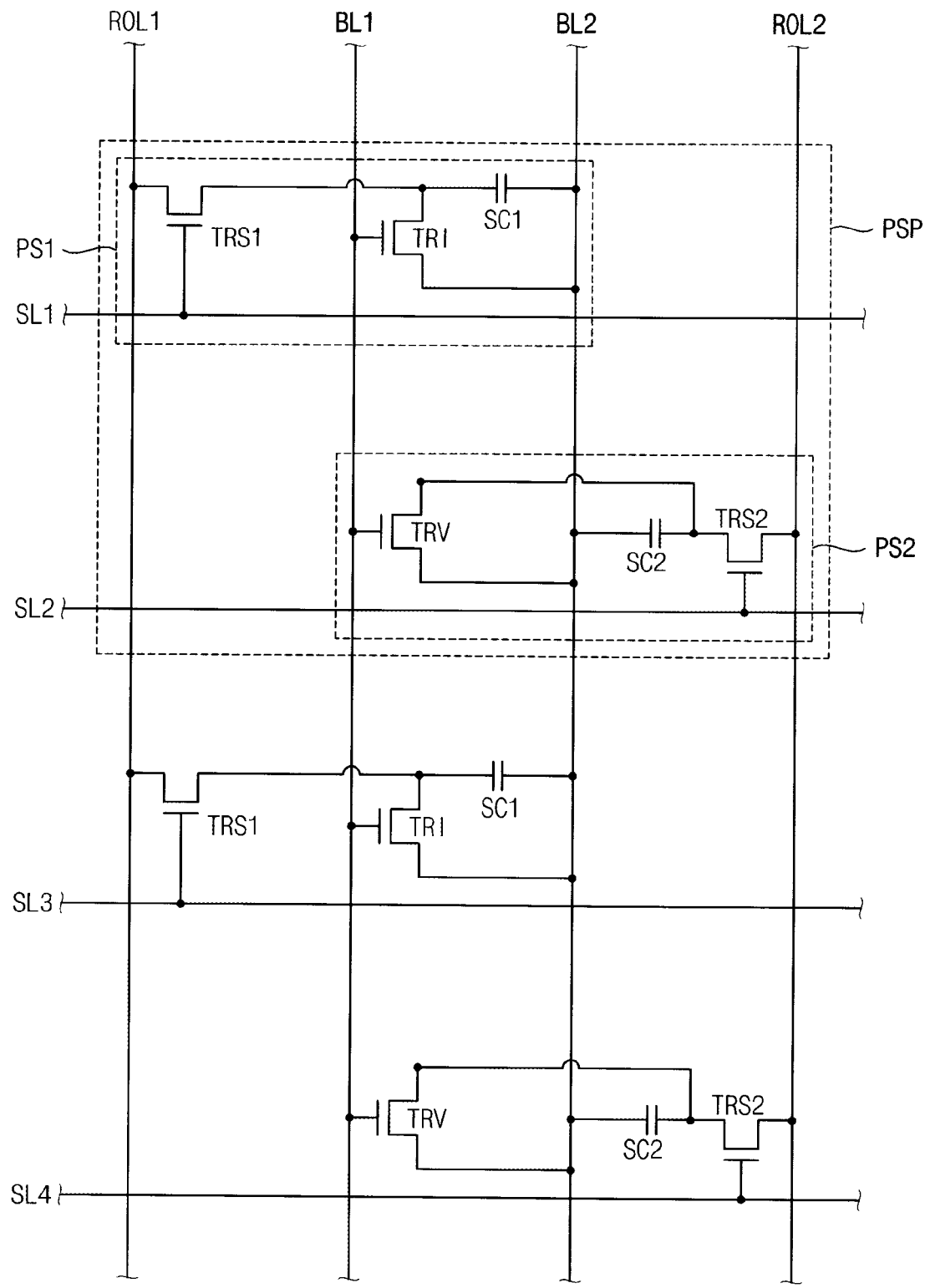
FIG. 3 is an equivalent circuit diagram illustrating the touch sensing display panel of FIG. 1.

FIG. 3 is an equivalent circuit diagram illustrating the touch sensing display panel of FIG. 1.

Referring to FIGS. 1 and 3, the touch sensing substrate 130 includes a plurality of read-out lines ROL1 and ROL2, a plurality of bias lines BL1 and BL2, a plurality of scan lines SL1 and SL2 and a light sensing part PSP. The light sensing part PSP includes a first light sensor PS1 sensing an infrared light and a second light sensor PS2 sensing a visible light. The first light sensor PS1 includes a first driving element TRS1, a first light sensing element TRI and a first sensing capacitor SC1; and the second light sensor PS2 includes a second driving element TRS2, a second light sensing element TRV and a second sensing capacitor SC2.

A first reference voltage Vr1 is applied to a first read-out line ROL1, and a second reference voltage Vr2 is applied to a second read-out line ROL2. A first bias voltage Vb1 is applied to the first bias line BL1, and a second bias voltage Vb2 is applied to the second bias line BL2. A scan signal Von is sequentially applied to a first scan line SL1 and a second scan line SL2.

The first driving element TRS1 includes a gate electrode connected to the first scan line SL1, a source electrode connected to the first read-out line ROL1 and a drain electrode connected to the first sensing capacitor SC1. The source and the drain electrodes may be changed with each other according to a voltage level applied to each of the source and drain electrodes. The first light sensing element TRI includes a gate electrode connected to the first bias line BL1 and the drain electrode of the first driving element TRS1, a source electrode connected to the first sensing capacitor SC1, and a drain electrode connected to the second bias line BL2. The first sensing capacitor SC1 includes a first electrode connected to the drain electrode of the first driving element TRS1 and the source electrode of the first light sensing element TRI, and a second electrode connected to the second bias line BL2.

The second driving element TRS2 includes a gate electrode connected to the second scan line SL2, a source electrode connected to the second read-out line ROL2 and a drain electrode connected to the second sensing capacitor SC2. The second light sensing element TRV includes a gate electrode connected to the first bias line BL1, a source electrode connected to the second driving element TRS2 and the second sensing capacitor SC2, and a drain electrode DE2 connected to the second bias line BL2. The second sensing capacitor SC2 includes a third electrode connected to the drain electrode of the second driving element TRS2 and the source electrode of the second light sensing element TRV, and a fourth electrode connected to the second bias line BL2.

A method of detecting a touch position of the touch sensing display panel 100 will now be explained. The touch sensing substrate 130 is driven during the blanking period of the frame.

In the blanking period of the N-th frame, when the scan signal of an "on" voltage Von is applied to the first scan line SL1, the first driving element TRS1 is turned on. Therefore, the first reference voltage Vr1 applied to the first read-out line ROL1 and the second bias voltage Vb2 applied to the second bias line BL2 are applied to the first sensing capacitor SC1. The first sensing capacitor SC1 charges a voltage by a difference between the first reference voltage Vr1 and the second bias voltage Vb2.

Then, when the scan signal of the on voltage Von is applied to the second scan line SL2, the second driving element TRS2 is turned on. Therefore, the second reference voltage Vr2 applied to the second read-out line ROL2 and the second bias voltage Vb2 applied to the second bias line BL2 are applied to the second sensing capacitor SC2. The second sensing capacitor SC2 charges a voltage by a difference between the second reference voltage Vr2 and the second bias voltage Vb2.

Then, when the scan signal of an off voltage Voff is applied to the first scan line SL1, the first driving element TRS1 is turned off. While the first driving element TRS1 is turned off, an infrared light generated at a backside of the touch sensing display panel 100 is reflected by the outer object touched on the surface of the touch sensing display panel 100 so that the reflected infrared light is provided to the first light sensing element TRI. When the first light sensing element TRI is driven by the infrared light, the first reference voltage Vr1 applied to the first electrode E1 of the first sensing capacitor SC1 drops by a photocurrent flowing through the first light sensing element TRI. Thus, the first sensing capacitor SC1 is discharged.

When the scan signal of an off voltage Voff is applied to the second scan line SL2, the second driving element TRS2 is turned off. While the second driving element TRS2 is turned off, a visible light generated at the backside of the touch sensing display panel 100 is reflected by the outer object touched to the surface of the touch sensing display panel 100 so that the reflected visible light is provided to the second light sensing element TRV. When the second light sensing element TRV is driven by the visible light, the second voltage Vr2 applied to the third electrode E3 of the second capacitor SC2 drops by a photocurrent flowing through the second light sensing element TRV. Thus, the second sensing capacitor SC2 is discharged.

In turning off the first and second switching elements TRS1 and TRS2, when the infrared light and the visible light are not provided to the first and second light sensing elements TRI and TRV, the photocurrent does not flow. Thus, the first and second sensing capacitors SC1 and SC2 are not discharged.

In the blanking period of the (N+1)-th frame that is the subsequent frame to the N-th frame, when the scan signal of the on voltage Von is applied to the first scan line SL1, the first driving element TRS1 is turned on to recharge the first sensing capacitor SC1 using the first reference voltage Vr1. During recharging of the first sensing capacitor SC1, the first read-out line RL1 carries a current so that the read-out driving part 310 connected to the first read-out line RL1 may detect the touch position using the current flowing through the first read-out line RL1. In addition, when the scan signal of the on voltage Von is applied to the second scan line SL2, the second switching element TRS2 is turned on to recharge the second sensing capacitor SC2 using the second reference voltage Vr2. Thus, the read-out driving part 310 connected to the second read-out line RL2 may detect the touch position using the current flowing through the second read-out line RL2.

First, second, third and fourth scan signals applied to first, second, third and fourth scan lines SL1, SL2, SL3 and SL4 may be different from each other. Alternatively, a substantially same scan signal may be applied to at least two even-numbered scan lines adjacent to each other to increase a sensing period in which the light sensing element senses the light. For example, the first scan signal may be applied to the first and second scan lines SL1 and SL2, and the second scan signal delayed from the first scan signal may be applied to the third and fourth scan lines SL3 and SL4. Alternatively, the substantially same scan signal may be applied to the first, second, third and fourth scan lines SL1, SL2, SL3 and SL4.

Each of the first and second light sensors PS1 and PS2 may be disposed on the touch sensing substrate 130 corresponding to an area in which the pixel unit is defined in the display substrate 110. The first and second light sensors PS1 and PS2 are disposed adjacent to each other. Each of the first and second light sensors PS1 and PS2 may be disposed on the touch sensing substrate corresponding to an area in which the switching element of the pixel unit is disposed.

Hereinafter, for example, the substantially same scan signal may be applied with a unit of four scan lines.

Figure 4:
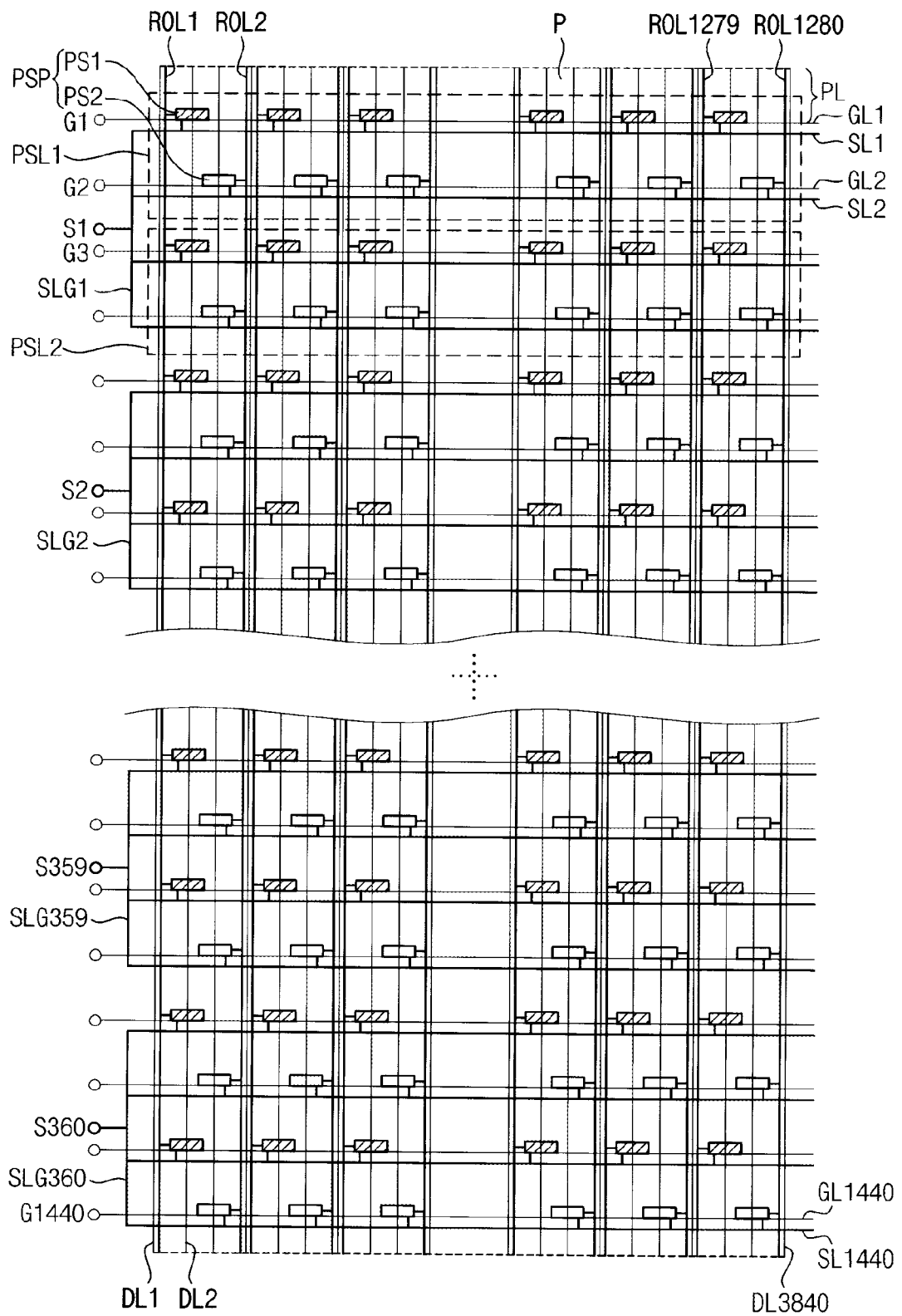
FIG. 4 is a plan view illustrating the touch sensing display panel of FIG. 1.
Figure 5:
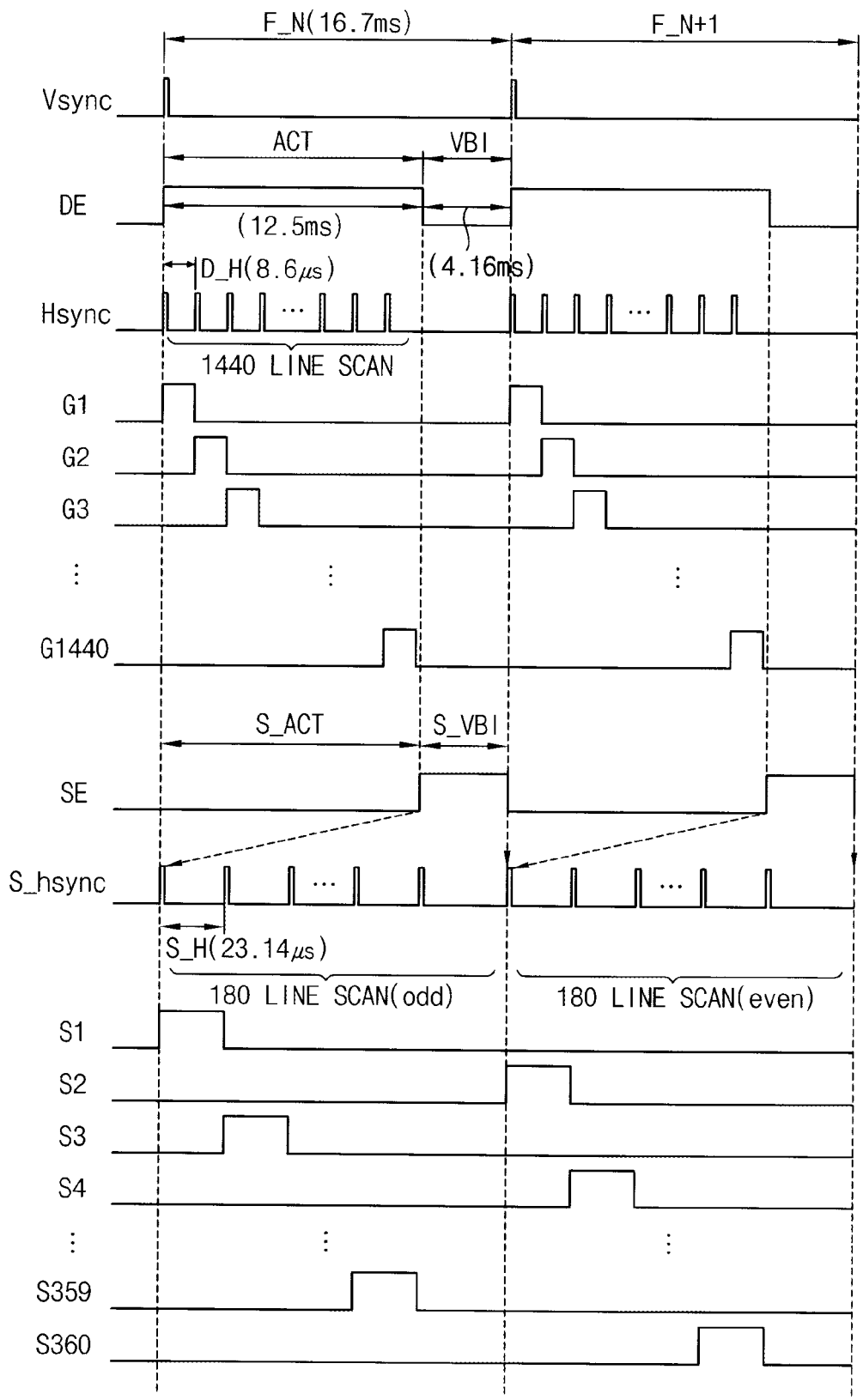
FIG. 5 is a waveform diagram illustrating a method of driving the touch sensing display panel shown in FIG. 4.

FIG. 4 is a plan view illustrating the touch sensing display panel of FIG. 1. FIG. 5 is a waveform diagram illustrating a method of driving the touch sensing display panel shown in FIG. 4.

Referring to FIGS. 1, 4 and 5, the touch sensing display panel 100 includes 3840 data lines DL1, DL2, . . . DL3840; 1440 gate lines GL1, GL2, . . . GL1440; 1280 read-out lines ROL1, ROL2, . . . ROL1280; and 1440 scan lines SL1, SL2, . . . SL1440.

The touch sensing display panel 100 includes a pixel row PL and a light sensor row PSL. The pixel row PL includes a plurality of sub-pixels P arranged in the row direction. The light sensor row PSL corresponds to two pixel rows PL and includes a plurality of light sensing parts PSP arranged in the row direction. For example, the touch sensing display panel 100 includes 1440 pixel rows PL and 720 light sensor rows PSL.

The 1440 scan lines SL1, SL2, . . . SL1440 are grouped into units of four scan lines, so that the touch sensing display panel 100 includes 360 groups of scan lines SLG1, SLG2, . . . SLG360. Each of the groups includes two light sensor rows PSL1 and PSL2 adjacent to each other, and light sensing parts PSP included in two light sensor rows PSL1 and PSL2 are electrically connected to each other.

The timing control part 200 outputs a vertical synchronization signal Vsync, a horizontal synchronization signal Hsync and a data enable signal DE for driving the touch sensing display pane 100. The vertical synchronization signal Vsync, the horizontal synchronization signal Hsync, the data enable signal DE, etc. may be preset by an external device such as a graphic card, etc. which provides the image data ID and the master clock signal MCK to the timing control part 200.

The N-th frame F_N and the (N+1)-th frame F_N+1 are divided based on the vertical synchronization signal Vsync. The active period ACT and the blanking period VBI of the frame are divided based on the data enable signal DE. The blanking period VBI corresponds to the sensing active period S_ACT, and the sensing active period S_ACT is preset based on a minimum sensing period during which the light sensing elements TRI and TRV sense the first and second lights.

For example, the blanking period VBI may be expanded as in Table 1.

TABLE 1

| NORMAL | | | MODIFIED | | |
|---|---|---|---|---|---|
| Htotal | | 2720 | Htotal | | 2720 |
| Hactive | | 2560 | Hactive | | 2560 |
| Hblank | Total | 160 | Hblank | Total | 160 |
| | Front porch | 32 | | Front porch | 32 |
| | Sync width | 48 | | Sync width | 48 |
| | Back porch | 80 | | Back porch | 80 |
| Vtotal | | 1481 | Vtotal | | 1920 |
| Vactive | | 1440 | Vactive | | 1440 |
| Vblank | Total | 41 | Vblank | Total | 480 |
| | Front porch | 3 | | Front porch | 3 |
| | Sync width | 5 | | Sync width | 5 |
| | Back porch | 33 | | Back porch | 472 |

Referring to Table 1, when the number of lines in the blanking period expands from 41 to 480, LVDS clock speed changes from about 60.4 MHz (a bandwidth is about 241.7 MHz with respect to one channel) to about 78.3 MHz (the bandwidth is about 313.3 MHz with respect to four channels). Thus, parameters of the timing control part are changed based on an input frequency of about 78.3 MHz so that the timing control part may be driven based on the expanded blanking period VBI.

During the active period ACT of the N-th frame F_N, the data driving part 210 and the gate driving part 230 drive the data lines DL1, DL2, . . . DL3840 and the gate lines GL1, GL2, . . . GL1440 of the touch sensing display panel 100.

Although not shown in the figure, the data driving part 210 sequentially provides horizontal line data to 1440 pixel rows in synchronization with the horizontal synchronization signal Hsync during the active period ACT. The horizontal synchronization signal Hsync has a first horizontal period D_H.

The gate driving part 230 sequentially provides 1440 gate signals G1, G2, . . . , G1440 to the gate lines GL1, GL2, . . . GLn in synchronization with the horizontal synchronization signal Hsync during the active period ACT. Each gate signal has a high level corresponding to the first horizontal period D_H.

Therefore, during the active period ACT of the N-th frame F_N, the data driving part 210 and the gate driving part 230 drive the touch sensing display panel 100 to display an N-th frame image.

In addition, the N-th frame F_N is divided into the sensing active period S_ACT and the sensing blanking period S_VBI based on the sensing enable signal SE. The sensing active period S_ACT corresponds to the blanking period VBI and the sensing blanking period S_VBI corresponds to the active period ACT.

The read-out driving part 310 provides the sensing driving signal to the touch sensing display panel 100 during the sensing active period S_ACT of the N-th frame F_N.

As described in FIG. 3, the sensing driving signal may include the first reference voltage Vr1 and the first bias voltage Vb1 for driving the first light sensing element TRI and the second reference voltage Vr2 and the second bias voltage Vb2 for driving the second light sensing element TRV.

The scan driving part 330 sequentially outputs 180 odd-numbered scan signals S1, S3, . . . , S359 to the odd-numbered scan line groups SLG1, SLG3, . . . SLG359 in synchronization with the sensing horizontal synchronization signal S_hsync during the sensing active period S_ACT of the N-th frame F_N. The sensing horizontal synchronization signal S_hsync has a second horizontal period S_H longer than the first horizontal period D_H. Each scan signal has a high level corresponding to the second horizontal period S_H.

Therefore, during the sensing active period S_ACT of the N-th frame F_N, the read-out driving part 310 reads out the sensing signal sensed from the light sensing part PSP electrically connected to the odd-numbered scan line groups SLG1, SLG3, . . . SLG359 of the touch sensing display panel 100.

Then, during the active period ACT of an (N+1)-th frame F_N+1, the data driving part 210 and the gate driving part 230 drive the data lines DL1, DL2, . . . DL3840 and the gate lines GL1, GL2, . . . GL1440, respectively, of the touch sensing display panel 100 to display an (N+1)-th frame image.

During the sensing active period S_ACT corresponding to the blanking period VBI of the (N+1)-th frame F_N+1, the read-out driving part 310 provides a sensing driving signal to the touch sensing display panel 100.

The scan driving part 330 sequentially outputs 180 even-numbered scan signals S2, S4, . . . , S360 to the even-numbered scan line groups SLG2, SLG4, . . . SLG360 in synchronization with the sensing horizontal synchronization signal S_hsync during the sensing active period S_ACT of the (N+1)-th frame F_N+1.

Therefore, during the sensing active period S_ACT of the (N+1)-th frame F_N+1, the read-out driving part 310 reads out the sensing signal sensed from the light sensing part PSP electrically connected to the even-numbered scan line groups SLG2, SLG4, . . . SLG360 of the touch sensing display panel 100.

The first and second light sensing elements TRI and TRV of the light sensing part PSP shown in FIG. 3 have a minimum sensing period for sensing the light. Therefore, the blanking period VBI may be preset based on the minimum sensing period.

The blanking period VBI may be expanded based on the minimum sensing period of the first and second light sensing elements TRI and TRV. For example, when the minimum sensing period is about 21 μs, the second horizontal period S_H of the sensing horizontal synchronization signal S_hsync, may be preset to about 23.14 μs and the blanking period VBI corresponding to the sensing active period S_ACT may be preset as about 4.16 ms. The active period ACT is decreased to about 12.5 ms with respect to a normal active period ACT of about 16.2 ms. Then the first horizontal period D_H of the horizontal synchronization signal Hsync may be decreased to about 8.6 μs.

As the first horizontal period D_H is decreased, a charging period in which the image data are charged in the touch sensing display panel 100, would decrease. To prevent the charging period from decreasing, a thickness of an insulating layer which is disposed between the gate line and the data line and insulates the gate line from the data line may be increased so that a capacitance between the gate line and the data line decreases. Alternatively, a thickness of the gate line may increase so that its line resistance may decrease. By such means may a delay margin of the gate signal decrease, and thus maintain an adequate charging margin of the image data.

Figure 6:
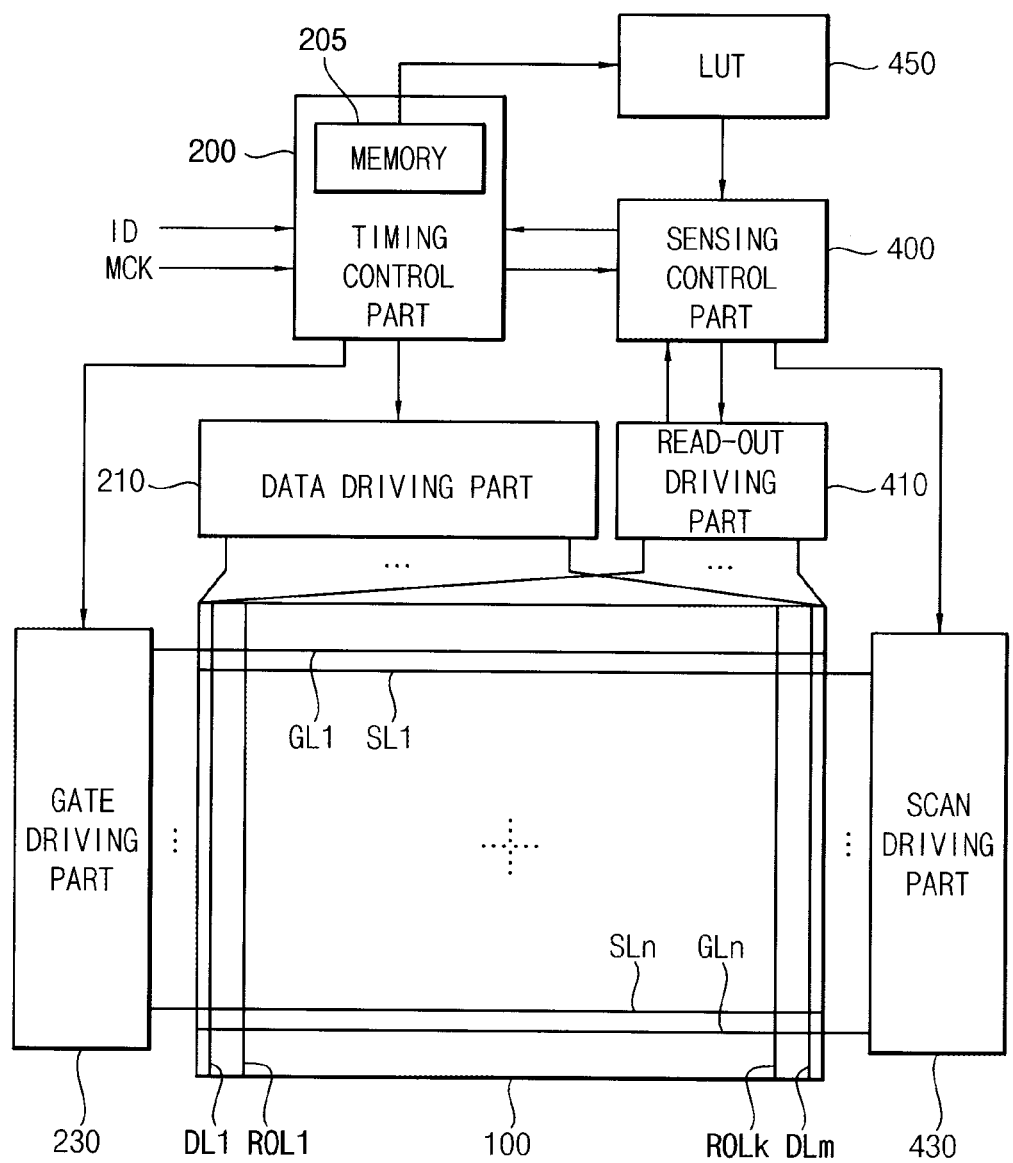
FIG. 6 is a block diagram illustrating a display apparatus according to another exemplary embodiment.

FIG. 6 is a block diagram illustrating a display apparatus according to another exemplary embodiment.

Hereinafter, the same reference numbers will be used to refer to the same or like parts as those described in the previous exemplary embodiment, and any repetitive detailed explanation will be omitted.

Referring to FIG. 6, the display apparatus includes a touch sensing display panel 100, a timing control part 200, a data driving part 210, a gate driving part 230, a sensing control part 400, a read-out driving part 410, a scan driving part 430 and a look up table (LUT) 450.

The timing control part 200 receives a master clock signal MCK and an image data ID from an external device. The timing control part 200 generates a timing control signal using the master clock signal MCK. The timing control signal includes a vertical synchronization signal, a horizontal synchronization signal and a data enable signal. The data enable signal divides a frame into an active period and a blanking period.

The timing control part 200 includes a memory 205. The memory 205 may store the image data by a frame unit or a line unit.

The sensing control part 400 generates a sensing control signal to drive the read-out driving part 410 and the scan driving part 430 based on the timing control signal received from the timing control part 220.

For example, the sensing control part 400 generates the sensing control signal based on the vertical synchronization signal, the horizontal synchronization signal and the data enable signal, and the sensing control signal includes a sensing enable signal and a sensing horizontal synchronization signal. The sensing enable signal includes a sensing active period and a sensing blanking period. The sensing active period overlaps with the active period and may be equal to or longer than the active period. The sensing blanking period overlaps the blanking period and may be equal to or shorter than the blanking period.

The read-out driving part 410 provides the sensing driving signal to the light sensing part PSP based on the sensing control signal received from the sensing control part 400, and reads out the sensing signal sensed from the light sensing part PSP through the read-out lines ROL1, ROL2, . . . ROLk.

The scan driving part 430 outputs the scan signals by a frame unit based on the sensing control signal received from the sensing control part 400 using a progressive scan mode. The scan driving part 430 sequentially outputs j scan signals during the sensing active period.

The LUT 450 stores a plurality of electrical and optical coupling values respectively corresponding to grayscales. The image data include a plurality of color data which include red data, green data and blue data. Color data have a plurality of grayscales. For example, color data of 8 bits may have 256 grayscales.

A level of a data voltage applied to the data line may be defined by the grayscale of the image data. Electrical coupling noise is coupling noise which influences the read-out line according to the level of the data voltage applied to the data line. Optical coupling noise is coupling noise which influences an amount of light transmitted to the touch sensing display panel 100 according to the color and grayscale of the image data. The electrical and optical coupling noses are measured according to the color and grayscale of the image data. The coupling value stored the LUT 450 is a normalized value normalizing the measured coupling noise.

The sensing control part 400 detects the coupling value corresponding to the image data of the N-th frame stored in the memory 205 using the LUT 450. The sensing control part 400 removes coupling noise included in the sensing signal received from the read-out driving part 410 during the N-th frame based on the detected coupling value. The sensing signal is sensed from the light sensing part disposed in the pixel unit corresponding to the image data. Therefore, the sensing control part 400 may obtain the corrected sensing signal after removing both the electrical and optical coupling noises.

Figure 7:
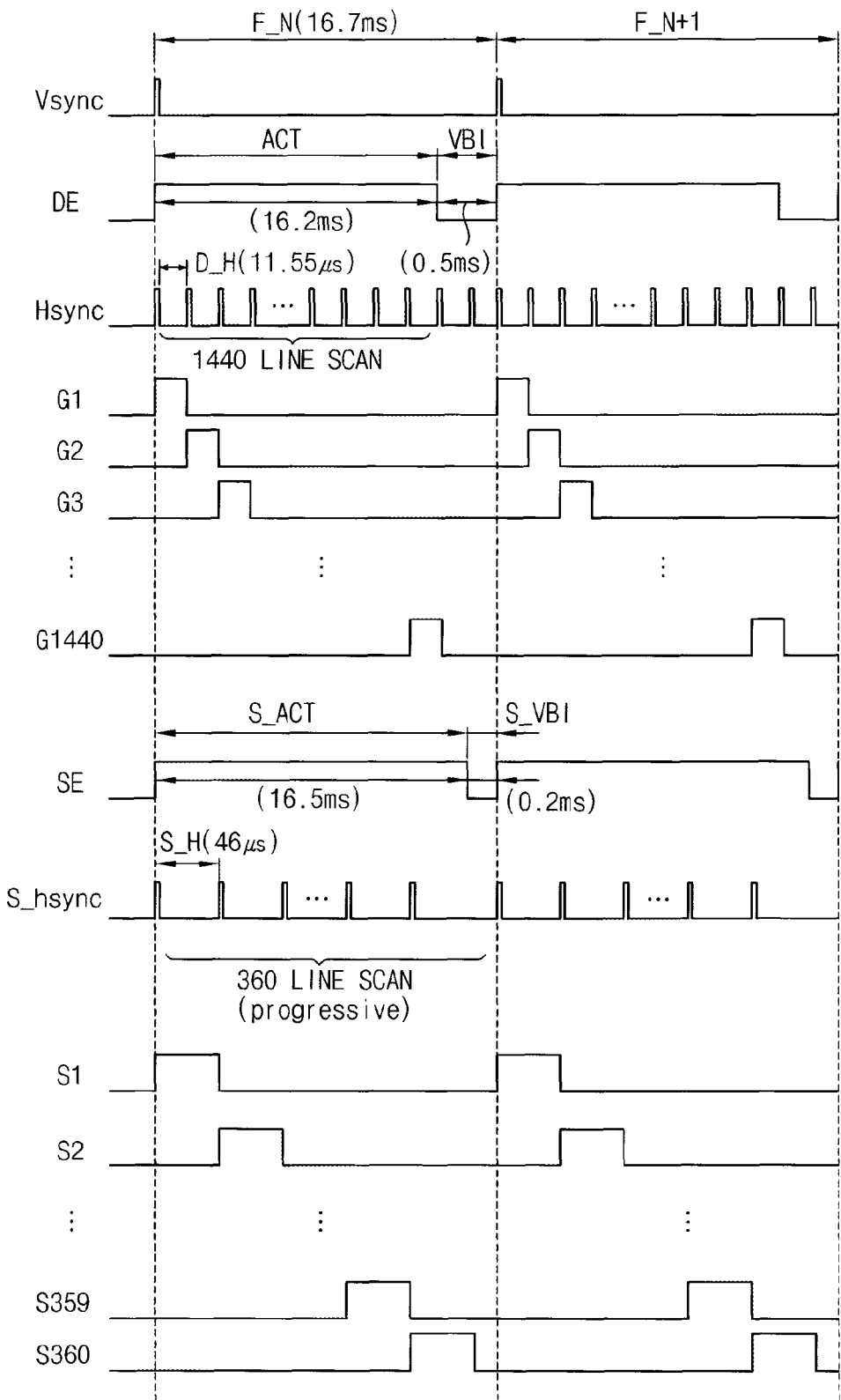
FIG. 7 is a waveform diagram illustrating a method of driving the touch sensing display panel shown in FIG. 6.

FIG. 7 is a waveform diagram illustrating a method of driving the touch sensing display panel shown in FIG. 6.

Referring to FIGS. 4, 6 and 7, the timing control part 200 outputs a vertical synchronization signal Vsync, a horizontal synchronization signal Hsync and a data enable signal DE to drive the touch sensing display panel 100. The horizontal synchronization signal Hsync has a first horizontal period D_H.

The N-th frame F_N and the (N+1)-th frame F_N+1 are divided based on the vertical synchronization signal Vsync. The active period ACT and the blanking period VBI of the frame are divided based on the data enable signal DE. In the present exemplary embodiment, the active period ACT is about 16.2 ms with respect to the frame period of about 16.7 ms, and is longer than the active period ACT (about 12.5 ms) according to the previous exemplary embodiment described in FIG. 5. In the present exemplary embodiment, however, the blanking period VBI is about 0.5 ms with respect to the frame period of about 16.7 ms, and is shorter than the blanking period VBI (about 4.16 ms) according to the previous exemplary embodiment described in FIG. 5.

During the active period ACT of the N-th frame F_N, the data driving part 210 and the gate driving part 230 drive the data lines DL1, DL2, . . . DL3840 and the gate lines GL1, GL2, . . . GL1440, respectively, of the touch sensing display panel 100.

The gate driving part 230 sequentially provides 1440 gate signals G1, G2, . . . G1440 to the gate lines GL1, GL2, . . . GLn in synchronization with the horizontal synchronization signal Hsync during the active period ACT. Each gate signal has a high level corresponding to the first horizontal D_H.

Therefore, during the active period ACT of the N-th frame F_N, the data driving part 210 and the gate driving part 230 drive the touch sensing display panel 100 to display an N-th frame image.

In addition, the N-th frame F_N is divided into the sensing active period S_ACT and the sensing blanking period S_VBI based on the sensing enable signal SE. The sensing active period S_ACT overlaps with the active period and may be equal to or larger than the active period. The sensing blanking period S_VBI overlaps the blanking period and may be equal to or shorter than the blanking period. For example, the sensing active period S_ACT may be about 16.5 ms and the sensing blanking period S_VBI may be about 0.2 ms.

The read-out driving part 310 provides the sensing driving signal to the touch sensing display panel 100 and reads out the sensing signal during the sensing active period S_ACT of the N-th frame F_N.

The scan driving part 430 sequentially outputs 360 scan signals S1, S2, . . . , S360 to the scan line groups SLG1, SLG3, . . . SLG360 in synchronization with the sensing horizontal synchronization signal S_hsync using the progressive scan mode during the sensing active period S_ACT of the N-th frame F_N. The sensing horizontal synchronization signal S_hsync has a second horizontal period S_H longer than the first horizontal period D_H. Each scan signal has a high level corresponding to the second horizontal period S_H.

Therefore, during the sensing active period S_ACT of the N-th frame F_N, the read-out driving part 310 reads out the sensing signal sensed from the light sensing part PSP electrically connected to the scan line groups SLG1, SLG2, . . . SLG360 of the touch sensing display panel 100.

In the present exemplary embodiment, the sensing signal sensed during the active period S_ACT of the N-th frame may include electrical coupling noise which occurs due to a voltage change of the data line.

The sensing control part 400 detects the coupling value corresponding to the image data of the N-th frame stored in the memory 205 using the LUT 450. The sensing control part 400 removes the coupling noise included in the sensing signal sensed in the N-th frame based on the detected coupling value. Therefore, the sensing control part 400 may obtain the corrected sensing signal after removing electrical and optical coupling noise.

In the present exemplary embodiment, electrical and optical coupling noise included in the sensing signal is removed, but is not limited thereto. For example, various noises included in the sensing signal may be pre-measured so that an estimate of the various noises included in the sensing signal may be removed using the pre-measured noise. Therefore, reliability of the sensing signal may be improved.

Figure 8:
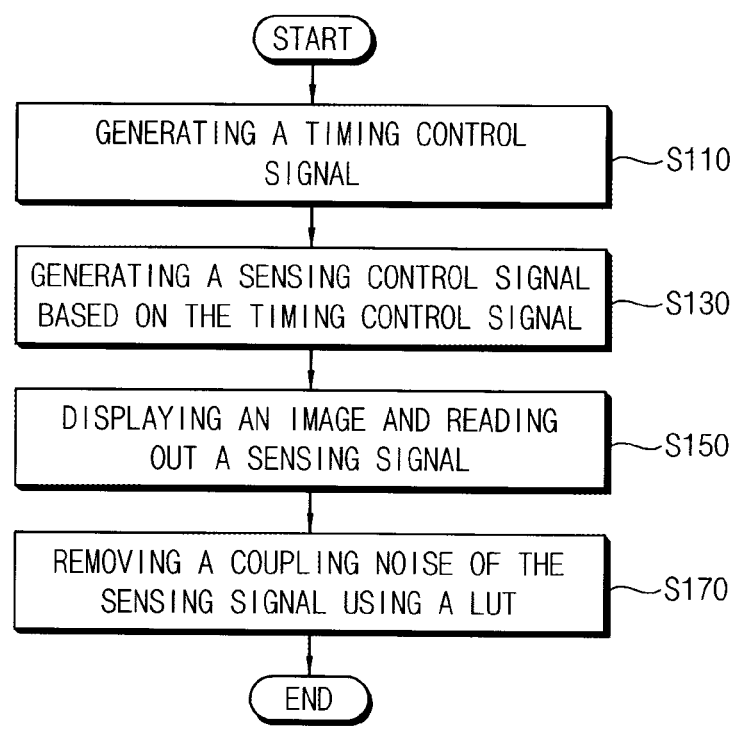
FIG. 8 is a flowchart illustrating a method of driving touch sensing display panel shown in FIG. 6.

FIG. 8 is a flowchart illustrating a method of driving a touch sensing display panel shown in FIG. 6.

Referring to FIGS. 6, 7 and 8, the timing control part 200 generates the timing control signal to drive the touch sensing display panel 100, and the timing control signal includes a vertical synchronization signal Vsync, a horizontal synchronization signal Hsync and a data enable signal DE (step S110). The data enable signal DE includes the active period ACT and the blanking period VBI. The horizontal synchronization signal Hsync has the first horizontal period D_H.

The sensing control part 400 generates the sensing control signal based on the vertical synchronization signal Vsync, the horizontal synchronization signal Hsync and the data enable signal DE, and the sensing control signal includes the sensing enable signal SE and the sensing horizontal synchronization signal S_hsync (step S130).

The sensing horizontal synchronization signal S_hsync has the second horizontal period S_H longer than the first horizontal period D_H. The sensing enable signal SE includes the sensing active period S_ACT and the sensing blanking period S_VBI, and the sensing active period S_ACT may be equal to or longer than the active period ACT. The sensing blanking period S_VBI may be equal to or shorter than the blanking period VBI.

During the active period ACT of the N-th frame F_N, the data driving part 210 and the gate driving part 230 drive the data lines DL1, DL2, . . . DL3840 and the gate lines GL1, GL2, . . . GL1440, respectively, based on the vertical synchronization signal Vsync, the horizontal synchronization signal Hsync and the data enable signal DE. The touch sensing display panel 100 thereby displays a frame image (step S150).

In addition, during the sensing active period S_ACT of the N-th frame F_N, the read-out driving part 410 and the scan driving part 430 drive the read-out lines ROL1, ROL2, . . . ROLk and the scan lines SL1, SL2, . . . SL1440 based on the sensing enable signal SE and the sensing horizontal synchronization signal S_hsync. Therefore, the read-out driving part 410 reads out the sensing signal corresponding to the touch position in which the outer object is touched on the surface of the touch sensing display panel 100 during the N-th frame F_N (step S150). The sensing signal read-out during the N-th frame F_N is generated through the touch sensing display panel 100 displayed an image corresponding to the image data of the N-th frame F_N, so that the sensing signal read-out during the N-th frame F_N includes the coupling value corresponding to the image data of the N-th frame F_N.

The sensing control part 400 detects the coupling value corresponding to the image data of the N-th frame stored in the memory 205 using the LUT 450. The sensing control part 400 removes coupling noise included in the sensing signal sensed in the N-th frame based on the detected coupling value (step S170). Therefore, the sensing control part 400 may obtain the sensing signal removing electrical and optical coupling noise.

According to the present exemplary embodiment, the active period ACT is more than that of the previous exemplary embodiment so that the charge ratio of the image data is not decreased compared with the previous exemplary embodiment, and various noises as well as electrical and optical noise included in the sensing signal may be removed using the LUT.

According to the present disclosure, in the touch sensing display panel having the display substrate and the touch sensing substrate integrally formed with each other, much of the coupling noise between the image signal and the sensing signal may be removed so that the reliability of the sensing signal may be improved.

The foregoing is illustrative of the present invention and is not to be construed as limiting thereof. Although a few exemplary embodiments have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of driving a touch sensing display panel, the method comprising:
    outputting image data to the touch sensing display panel during an active period of a frame, the touch sensing display panel comprising a display substrate including a switching element connected to a data line extending in a column direction and a gate line extending in a row direction, and a touch sensing substrate including a light sensing part connected to a read-out line substantially parallel to the data line and a scan line substantially parallel to the gate line; and
    reading out a sensing signal through the read-out line during a blanking period of the frame,
    wherein reading out the sensing signal comprises:
        outputting an odd-numbered scan signal during the blanking period of an N-th frame (N is a natural number); and
        outputting an even-numbered scan signal during the blanking period of an (N+1)-th frame.

2. The method of claim 1, wherein the light sensing part includes a first light sensing element sensing a first light and a second light sensing element sensing a second light and the touch sensing substrate includes a light sensor row in which a plurality of light sensing parts is arranged in a row, and
    at least one light sensor row receives a substantially same scan signal.

3. The method of claim 2, wherein the odd-numbered scan signal is provided to the light sensing parts included in the first light sensor row and a second light sensor row adjacent to the first light sensor row, and the even-numbered scan signal is provided to the light sensing parts included in a third light sensor row adjacent to the second light sensor row and a fourth light sensor row adjacent to the third light sensor row.

4. A method of driving a touch sensing display panel, the method comprising:

providing image data to a data line of a touch sensing display panel during an active period of a frame;

reading out a sensing signal sensed by a light sensing part of the touch sensing display panel on a read-out line during the active period of the frame; and removing coupling noise included in the sensing signal based on a coupling value preset corresponding to the image data, wherein the coupling value corresponds to measured optical and electrical coupling noise between the data line and the read-out line for a grayscale of the image data, wherein the coupling value is stored as a look-up table (LUT) according to grayscales of the image data.

5. The method of claim 4, wherein reading out the sensing signal comprises:

providing the scan signal to the scan line by one frame period using a progressive scan mode.

6. The method of claim 5, wherein the light sensing part includes a first light sensing element sensing a first light and a second light sensing element sensing a second light and the touch sensing substrate includes a light sensor row in which a plurality of light sensing parts is arranged in a row, and at least one light sensor row receives a substantially same scan signal.

7. The method of claim 6, wherein the light sensing parts included in a first light sensor row, a second light sensor row adjacent to the first light sensor row, a third light sensor row adjacent to the second light sensor row and a fourth light sensor row adjacent to the third light sensor row receives the substantially same scan signal.

8. A display apparatus comprising:

a touch sensing display panel comprising a display substrate that includes a switching element connected to a data line extending in a column direction and a gate line extending in a row direction, and a touch sensing substrate that includes a light sensing part connected to a read-out line substantially parallel to the data line and a scan line substantially parallel to the gate line;

a data driving part outputting image data to the touch sensing display panel during an active period of a frame;

a read-out driving part reading out a sensing signal through the read-out line during a blanking period of the frame;

a timing control part generating a timing control signal based on a master clock signal;

a sensing control part generating a sensing control signal based on the timing control signal; and a scan driving part outputting an odd-numbered scan signal during the blanking period of an N-th frame (N is a natural number), and outputting an even-numbered scan signal during the blanking period of an (N+1)-th frame.

9. The display apparatus of claim 8, wherein the touch sensing display panel includes a light sensor row in which a plurality of light sensing parts is arranged in a row, and the scan driving part provides a substantially same scan signal to at least one light sensor row.

10. The display apparatus of claim 9, wherein the light sensing part comprises:

a first driving element connected to a first read-out line and a first scan line;

a first light sensing element connected to a first bias line adjacent to the first read-out line and the first driving element, and sensing a first light;

a second driving element connected to a second read-out line and a second scan line; and a second light sensing element connected to a second bias line adjacent to the first bias line and the second driving element, and sensing a second light.

11. A display apparatus comprising:

a touch sensing display panel comprising a display substrate that includes a switching element connected to a data line extending in a column direction and a gate line extending in a row direction, and a touch sensing substrate that includes a light sensing part connected to a read-out line substantially parallel to the data line and a scan line substantially parallel to the gate line;

a data driving part outputting image data to the touch sensing display panel during an active period of a frame;

a read-out driving part reading out a sensing signal through the read-out line during a blanking period of the frame;

a sensing control part removing coupling noise included in the sensing signal based on a coupling value preset corresponding to the image data, wherein the coupling value corresponds to measured optical and electrical coupling noise between the data line and the read-out line for a grayscale of the image data; and a look-up table (LUT) storing the coupling value according to grayscales of the image data.

12. The display apparatus of claim 11, further comprising:

a timing control part generating a timing control signal based on a master clock signal and including a memory storing the image data.

13. The display apparatus of claim 11, wherein the scan driving part provides a scan signal to the scan line by one frame period using a progressive scan mode.

14. The display apparatus of claim 13, wherein the touch sensing display panel includes a light sensor row in which a plurality of light sensing parts is arranged in a row, and the scan driving part provides a substantially same scan signal to at least one light sensor row.

15. The display apparatus of claim 14, wherein the light sensing part comprises:

a first driving element connected to a first read-out line and a first scan line;

a first light sensing element connected to a first bias line adjacent to the first read-out line and the first driving element, and sensing a first light;

a second driving element connected to a second read-out line and a second scan line; and a second light sensing element connected to a second bias line adjacent to the first bias line and the second driving element, and sensing a second light.

* * * * *